(12) United States Patent
Santan et al.

(10) Patent No.: US 10,018,530 B2
(45) Date of Patent: Jul. 10, 2018

(54) SYSTEM FOR MEASURING TRANSMISSION OF LIGHT THROUGH GLASSES

(71) Applicant: Signet Armorlite, Inc., Carlsbad, CA (US)

(72) Inventors: Prashant Santan, San Diego, CA (US); Newton M. Tarleton, Vista, CA (US); Gavin Ho, San Diego, CA (US)

(73) Assignee: Signet Armorlite, Inc., Carlsbad, CA (US)

( * ) Notice: Subject to any disclaimer, the term of this patent is extended or adjusted under 35 U.S.C. 154(b) by 0 days.

(21) Appl. No.: 15/089,022

(22) Filed: Apr. 1, 2016

(65) Prior Publication Data
US 2017/0284894 A1    Oct. 5, 2017

(51) Int. Cl.
| | |
|---|---|
| *G01N 21/59* | (2006.01) |
| *G01M 11/02* | (2006.01) |
| *G02B 6/44* | (2006.01) |
| *G02B 3/04* | (2006.01) |

(52) U.S. Cl.
CPC .... *G01M 11/0285* (2013.01); *G01M 11/0214* (2013.01); *G02B 3/04* (2013.01); *G02B 6/4401* (2013.01)

(58) Field of Classification Search
CPC ........... G01N 21/59; G02C 7/10; G02C 7/027
USPC ........................................................ 356/124
See application file for complete search history.

(56) References Cited

U.S. PATENT DOCUMENTS

| | | | | | |
|---|---|---|---|---|---|
| 4,549,081 | A | * | 10/1985 | Ace | G01N 21/33 250/372 |
| 6,091,546 | A | * | 7/2000 | Spitzer | G02B 27/017 345/8 |
| 7,500,746 | B1 | * | 3/2009 | Howell | G02C 11/00 351/158 |
| 9,000,390 | B2 | * | 4/2015 | Citek | G02C 7/028 250/372 |
| 9,529,197 | B2 | * | 12/2016 | Olsson | G06F 1/163 |
| 2004/0145729 | A1 | * | 7/2004 | Verfel | G01M 11/02 356/124 |
| 2007/0121100 | A1 | * | 5/2007 | Divo | G02C 13/005 356/124 |
| 2013/0341523 | A1 | * | 12/2013 | Citek | G02C 7/028 250/372 |
| 2016/0349539 | A1 | * | 12/2016 | Waisman | G02C 11/10 |

* cited by examiner

*Primary Examiner* — Roy M Punnoose
(74) *Attorney, Agent, or Firm* — Ice Miller LLP (57) ABSTRACT

A system is disclosed for measuring the transmission of light through a pair of eyeglasses having least one eyeglass lens mounted in a spectacle frame having a position of wear. The system comprises a light source, a support for mounting the eyeglasses, and a light detector coupled to the support. The support is configured to mount the eyeglasses with the position of wear relative to the light detector. A microprocessor is coupled to the light detector, and a display coupled to the processor. The processor receives spectral data from the light detector and outputs the spectral data to the display as a spectral curve.

33 Claims, 6 Drawing Sheets

SYSTEM FOR MEASURING TRANSMISSION OF LIGHT THROUGH GLASSES

BACKGROUND

The present invention relates to systems for measuring the transmission of light through optical systems and, in particular, to systems for measuring the attenuation of light transmitted through an eyeglass lens.

Optical systems, such as eyeglasses, are commonly designed to filter portions of the light spectrum. For example, eyeglass lenses are frequently designed to attenuate the transmission of light in wavelengths that cause discomfort to the wearer or damage to the eyes—e.g., wavelengths corresponding to UV and/or high energy visible light (e.g., blue light). However, not all high energy visible light is harmful. Certain wavelengths of blue light are believed to be important for regulation of circadian sleep/wake cycles. Consequently, such lenses may have complex filtering properties—e.g., may only attenuate certain wavelengths and/or have varying degrees of attenuation over a range of wavelengths corresponding to blue light.

Eyeglass lens designs that block similar portions of the spectrum can be difficult to differentiate. The filtering properties of eyeglass lenses are typically measured in a laboratory setting, and the test results are not provided in real time and may not be accessible to an eyecare professional or eyeglass wearer. Furthermore, lens performance is often reported in broad terms (e.g., 100% UV protection), or using different standards or scales that cannot easily be compared. Such information may not be sufficient to fully understand the complex filtering properties of a lens, or to adequately differentiate between lenses with similar features.

In addition, laboratory testing is commonly performed under optimal conditions that fail to take into account the performance of eyeglasses under actual conditions of use. Laboratory tests typically involve the use of unfinished or semifinished lens blanks, and measure the transmission of a brief flash of light from a pin point source along an axis centered on and normal to the lens surface. Such tests do not reflect actual conditions of general lighting or sunlight, and may not provide a useful measure of transmission of the solar spectrum. Furthermore, eyeglass lenses are ground to prescription and are fitted to an eyeglass frame to accommodate the wearer's face and head geometry, which may factor in the transmission of light through the lens. The eyeglass lenses are generally held in the eyeglass frame at a slight tilt around a horizontal axis relative to the primary gaze angle (pantoscopic tilt), and may also have tilt around a vertical axis relative to the primary gaze angle (panoramic angle or wrap angle). The position of the pupil on the eyeglass lens (optical center) is commonly displaced from the center of the eyeglass frame. Eyeglasses may also take into account the distance between the wearer's cornea and the back of the lens (vertex distance). Such fitting parameters are commonly referred to as "position of wear".

Therefore, there is a need for a system for measuring the transmission of light through eyeglasses or other optical systems that provides detailed spectral data in real time. It would also be desirable to provide a system that measures the transmission of light taking into account the position of wear of the eyeglasses.

SUMMARY

Systems are disclosed for measuring transmission of light through a pair of eyeglasses including at least one eyeglass lens mounted in an eyeglass frame with a position of wear. In one embodiment, the system comprises a light source, a support for mounting the eyeglasses, and a light detector coupled to the support. The support is configured to mount the eyeglasses with the position of wear relative to the light detector.

In another embodiment, the system comprises a light source, a support sized and shaped as a human head for mounting the eyeglasses, the support having features corresponding to a nose, an ear and an eye, wherein the nose and ear are configured to mount the eyeglasses with a position of wear relative to the eye, and a light detector coupled to the support at the eye.

Systems are also disclosed for comparing the transmission of light through first and second eyeglasses, respectively having an eyeglass lens mounted in an eyeglass frame with first and second positions of wear. In one embodiment, the system comprises a light source, first and second supports for mounting the first and second eyeglasses, the first and second supports having about the same distance from and mirror orientation to the light source, and first and second light detectors respectively coupled to the first and second supports. The first support is configured to mount the first eyeglasses with the first position of wear relative to the first light detector, and the second support is configured to mount the second eyeglasses with the second position of wear relative to the second light detector.

BRIEF DESCRIPTION OF THE FIGURES

The embodiments described herein and other features, advantages, and disclosures contained herein, and the manner of attaining them, will be better understood from the following description in conjunction with the accompanying drawing figures, in which like reference numerals identify like elements, and wherein.

DETAILED DESCRIPTION

In the following detailed description of embodiments of the present disclosure, reference is made to the accompanying drawings that form a part hereof, and in which is shown by way of illustration, and not by way of limitation, such specific embodiments. It is to be understood that other embodiments may be utilized and that changes may be made without departing from the spirit and scope of the present disclosure.

Figure 1:
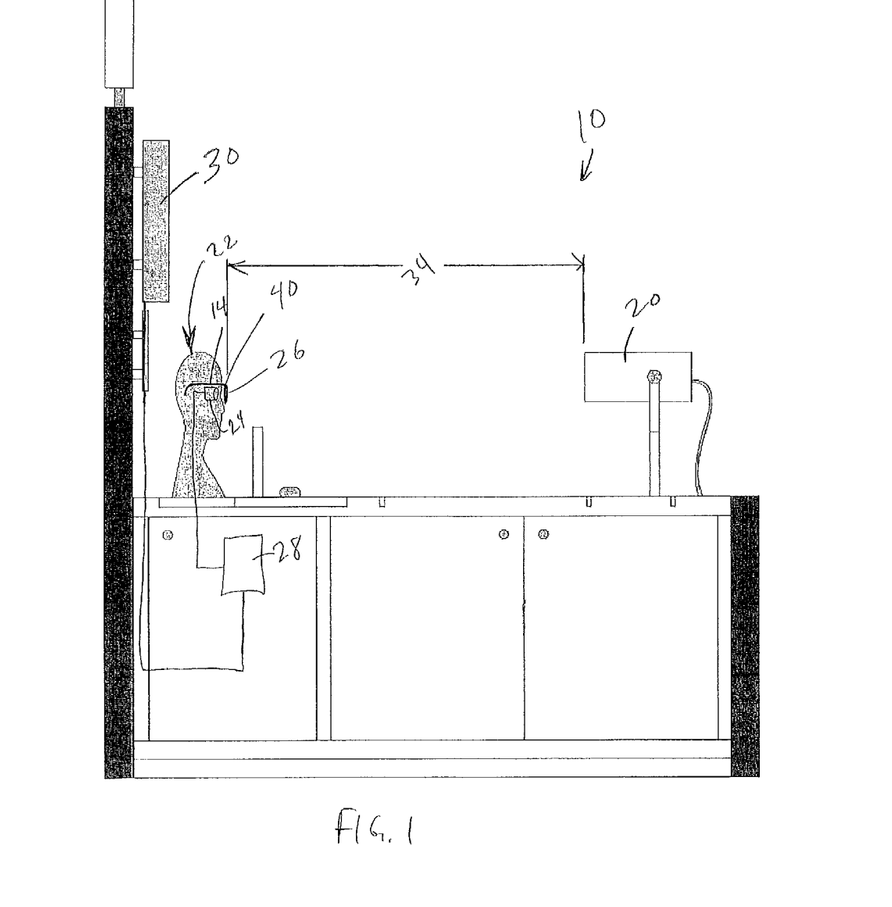
FIG. 1 is a side elevation view of a system for measuring transmission of light in accordance with an embodiment of the present disclosure.
Figure 2:
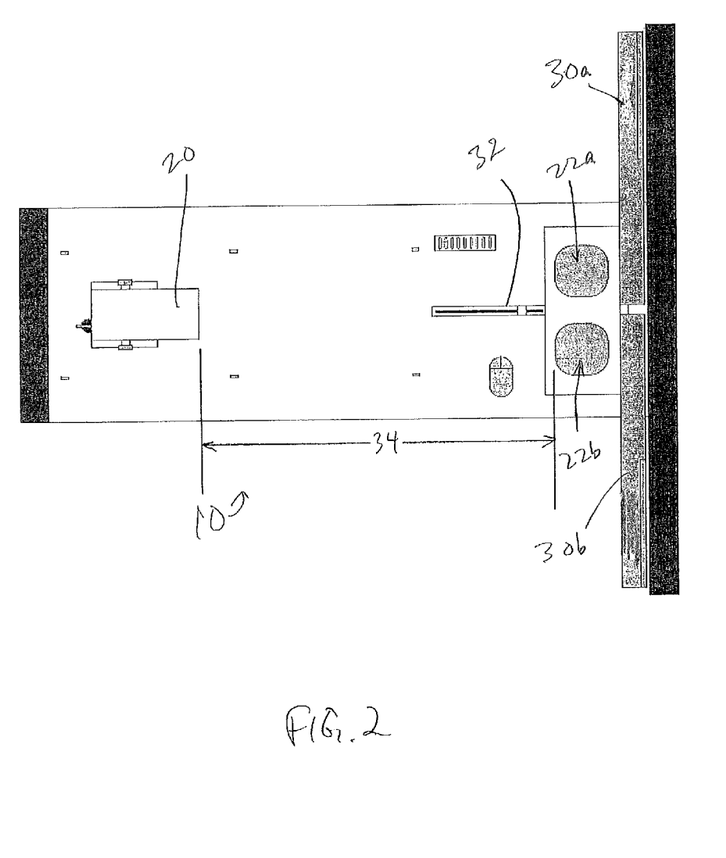
FIG. 2 is a top plan view of the system for measuring transmission of light illustrated in FIG. 1.
Figure 3:
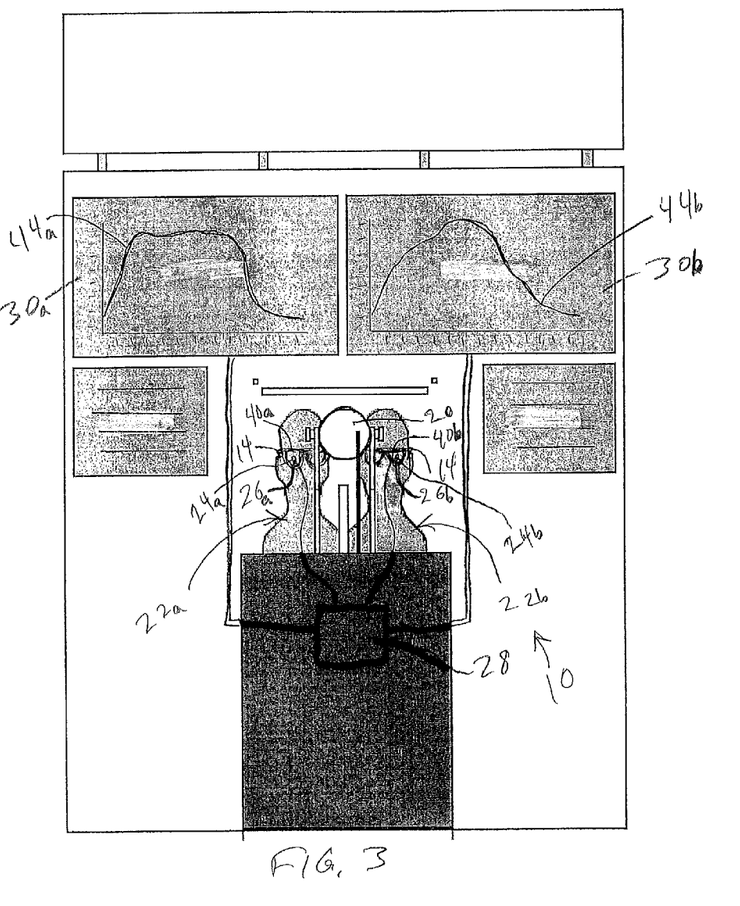
FIG. 3 is a front elevation view of the system for measuring transmission of light illustrated in FIGS. 1 and 2.

Reference is now made to FIGS. 1-3, which illustrate a system 10 for measuring the transmission of light through a pair of eyeglasses 40. The pair of eyeglasses 40 includes at least one eyeglass lens 26 mounted in an eyeglass frame 14 with a position of wear—i.e. having one or more of the parameters: pantoscopic tilt, optical center, vertex distance and panoramic angle. System 10 includes a support 22 for mounting eyeglasses 40, and a light source 20 spaced from and generally directed toward the support. A light detector 24 is coupled to support 22 and positioned to receive light from light source 20 transmitted through eyeglass lens 26. In one embodiment, a microprocessor 28 is coupled to light detector 24 and a display 30, to receive spectral data from the light detector and output the spectral data to the display.

Figure 4:
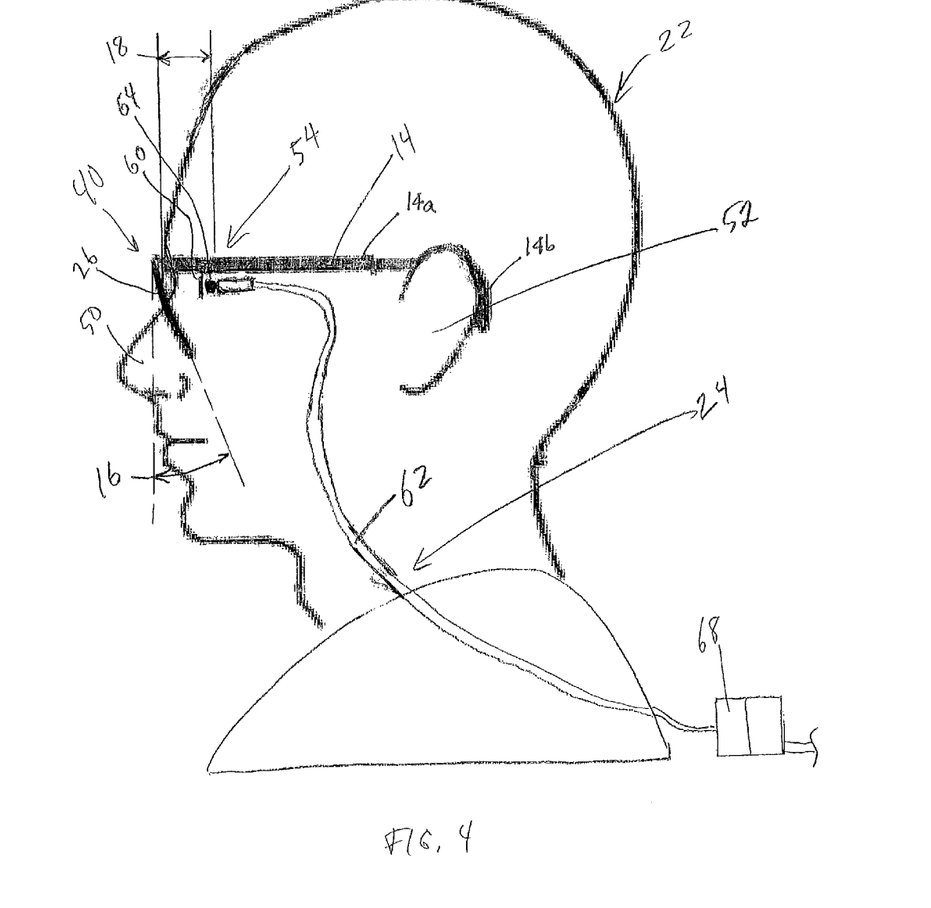
FIG. 4 is a side elevation view of a support for mounting a pair of eyeglasses in accordance with an embodiment of the present disclosure.
Figure 5:
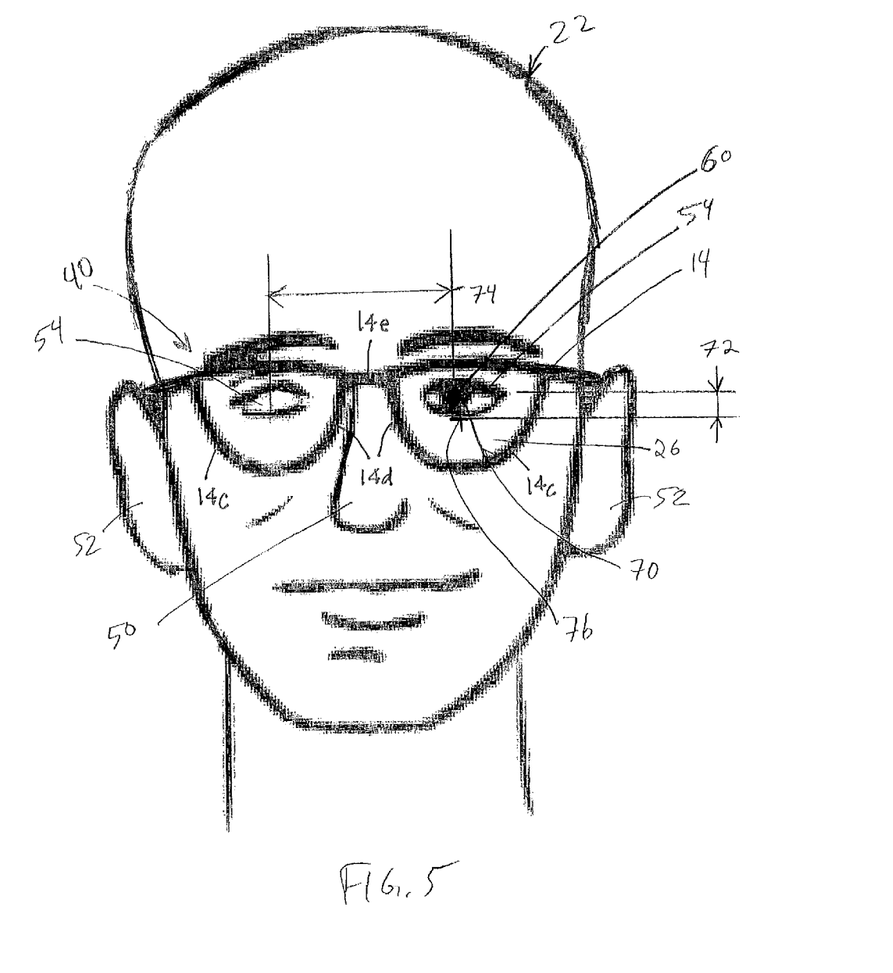
FIG. 5 is a front elevation view of the support for mounting a pair of eyeglasses illustrated in FIG. 4.
Figure 6:
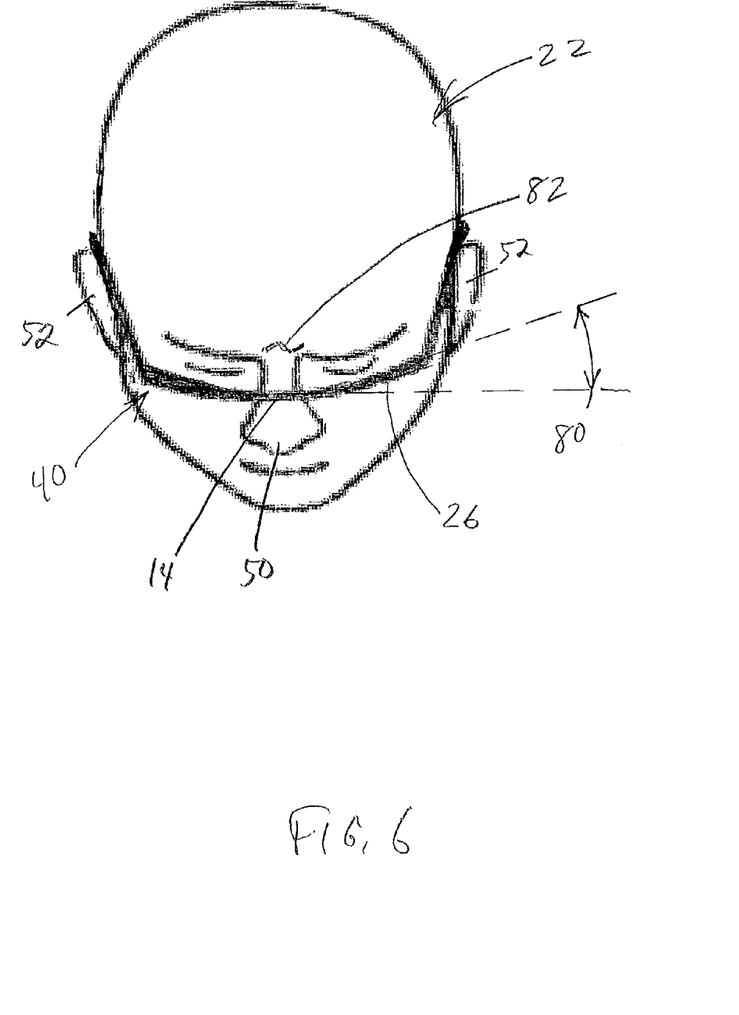
FIG. 6 is a top plan view of the support for mounting a pair of eyeglasses illustrated in FIGS. 4 and 5.

Support 22 is configured to mount eyeglasses 40 with the position of wear relative to light detector 24. In one embodiment, support 22 has one or more flanges for supporting the temple(s) 14a and/or earpiece(s) 14b of eyeglasses 40. In a further embodiment, the support 22 has one or more flanges for supporting the front of eyeglasses 40—e.g., by supporting the rim(s) 14c, the nose pad(s) 14d and/or the bridge 14e. The flange(s) are configured to support eyeglasses 40 to approximate the position of wear of the eyeglasses relative to the optical axis and position of light detector 24. In a preferred embodiment, support 22 is sized and shaped to simulate or approximate a human head, with flanges 50, 52 that that simulate or otherwise correspond to a nose 50 and ears 52 for respectively supporting the nose pads and temples of a pair of eyeglasses 40, as best shown in FIGS. 4-6.

In one embodiment, the position of wear comprises a predetermined pantoscopic tilt 16, and support 22 is configured to mount eyeglasses 40 to approximate the predetermined pantoscopic tilt relative to the optical axis of light detector 24. In a preferred embodiment, support 22 is configured to mount the pair of eyeglasses 40 to have a pantoscopic tilt 16 in a range between about 0° to about 15° relative to the optical axis of light detector 24, and more preferably between about 3° to about 10°.

In another embodiment, the position of wear comprises a predetermined optical center 70, and support 22 is configured to mount eyeglasses 40 to approximate the predetermined optical center relative to the optical axis of light detector 24. The optical center of an eyeglass lens within an eyeglass frame may be defined by various parameters known in the art, including the pupillary height 72 and an interpupillary distance 74. In a preferred embodiment, support 22 is configured to mount eyeglasses 40 to have a pupillary height 72 in a range between about 3 mm to about 7 mm above the geometric center 76 of the eyeglass lens 26 and an interpupillary distance 74 in a range between about 48 mm to about 73 mm relative to the optical axis of light detector 24. More preferably the interpupillary distance 74 is in a range between about 54 mm to about 68 mm.

In another embodiment, the position of wear comprises a predetermined vertex distance 18, and support 22 is configured to mount eyeglasses 40 to approximate the predetermined vertex distance relative to the position of light detector 24. In a preferred embodiment, support 22 is configured to mount eyeglasses 40 to have a vertex distance 18 in a range between about 5 mm to about 20 mm relative to the position of light detector 24, more preferably in a range between about 10 mm to about 15 mm.

In another embodiment, the position of wear comprises a predetermined panoramic angle or wrap angle 80, and support 22 is configured to mount eyeglasses 40 to approximate the predetermined panoramic angle relative to the optical axis of light detector 24. Those of skill in the art will appreciate that most eyeglass frames will have a panoramic angle less than about 5°. However, some wrap around eyeglass frame designs, such as used for safety glasses and sunglasses, may have wrap angles as large as 25° or more. In a preferred embodiment, support 22 is configured to mount eyeglasses 40 to have a panoramic angle in a range between about 0° to about 25° relative to the optical axis of light detector 24, and more preferably in a range between about 0° to about 5°.

In yet another embodiment, head-shaped support 22 comprises features that simulate or otherwise correspond to an eye(s) 54 that is positioned to receive light from the light source 20 transmitted through the eyeglass lens 26. Light detector 24 is positioned at the eye and oriented such that the optical axis of the light detector approximates the primary gaze angle and visual axis of simulated eye 54. In a preferred embodiment, eye 54 has an aperture 60 corresponding to a pupil, and light detector 24 is positioned in the aperture.

Light detector 24 is preferably configured to collect spectral data regarding the light from light source 20 transmitted through eyeglass lens 26. In one embodiment, light detector 24 comprises a spectrometer—e.g. a spectrophotometer, spectroscope, spectrograph or similar instrument as are known in the art for measuring light intensity as a function of wavelength. In a preferred embodiment, spectrometer 68 is coupled to support 22 by an optical fiber 62 that is mounted in the support. Suitable light detectors include the Flame Series VIS/UV modular spectrometer with a 74-UV collimating optic (Ocean Optics—Dunedin, Fla.) coupled to a 600 micron optical fiber.

In a further embodiment, light detector 24 comprises a lens 64 mounted in support 22 for collecting light from a field of view. Optical fiber 62 is coupled to lens 64 to transmit the light collected by the lens to the spectrometer 68. Where support 22 has an eye 54 with an aperture 60, lens 64 may be mounted in the aperture. Lens 64 may be any one of various collimating lenses known in the art. In one embodiment, lens 64 is an aspheric lens. Suitable lenses include TECHSPEC Hybrid Asphere lens (Edmund Optics Inc.—Barrington, N.J.) having a 12 mm diameter and 9 mm effective focal length. In a preferred embodiment, lens 64 is an uncoated lens that does not itself attenuate transmission of light. The optical axis of lens 64 is the optical axis of light detector 24, and the vertex distance is the distance between surface of lens 64 and the back of eyeglass lens 26.

Light source 20 provides a beam of light over a broad spectrum of wavelengths. In one embodiment, light source 20 has a spectral curve that simulates or approximates the spectral curve of natural sunlight (solar spectrum) over at least a portion of the range of wavelengths covering the UV-visible spectrum (e.g., from about 280 nm to about 700 nm), and more preferably over the UV-Blue spectrum (e.g, from about 280 nm to about 500 nm). In a further preferred embodiment, light source 20 provides a continuous, wide beam of light—e.g., a beam of light that is at least about the width of eyeglass lens 26. In a further embodiment, light source 20 provides a beam of light with sufficient intensity to differentiate its spectral signal from the ambient light (e.g., indoor lighting).

The light source 20 may be any one of various types of lamps known in the art, including a xenon arc lamp and a deuterium halogen combination lamp. In one embodiment, light source 20 comprises a lamp with a filter that modifies the spectral curve of the lamp to simulate natural sunlight in a range of wavelengths covering the UV-visible spectrum. Suitable lamps include a Xelios XE-100B xenon lamp (Cirrus Photonics, LLC—Orlando, Fla.).

System 10 may include a microprocessor 28 coupled to light detector 24 for receiving spectral data from the light detector. The spectral data may be further processed or analyzed by microprocessor 28, stored to local memory or remote storage coupled to microprocessor 28, and/or compared to other spectral data, or a standard or reference previously stored by microprocessor 28. In one embodiment, microprocessor 28 is configured to analyze the spectral data to determine the spectral curve of the light from light source 20 transmitted through eyeglass lens 26—e.g., as the percentage transmission of light $T_\lambda$ at a wavelength $\lambda$ according to the equation:

$$T_\lambda = [(S_\lambda - D_\lambda)/(R_\lambda - D_\lambda)] \times 100$$

where:
$S_\lambda$=Sample light intensity at wavelength $\lambda$;
$D_\lambda$=Background light intensity at wavelength $\lambda$; and
$R_\lambda$=Reference light intensity at wavelength $\lambda$.

The reference light $R_\lambda$ is the light transmitted without eyeglasses 40 mounted on support 22.

Measurement of the background intensity $D_\lambda$ may be performed using a removable shield (not shown) that blocks light transmitted through eyeglass lens 26 from reaching light detector 24. The support 22 may be provided with a mount to reproducibly position the shield at the same location, and ensure a repeatable background measurement and accurate comparison of different lenses.

As shown in the equation above, the background measurement $D_\lambda$ is subtracted from the incident light ($S_\lambda$, $R_\lambda$) received by light detector 24 to determine the attenuation of light transmission attributable to eyeglass lens 26. In one embodiment, the shield and/or mount are configure such that no light is received by light detector 24 and the background $D_\lambda$ measurement corresponds to the dark spectrum or noise in system 10. In an alternative embodiment, the shield and/or mount are configured such that the background measurement $D_\lambda$ includes stray light—i.e. light reaching the light detector 24 that is not transmitted from light source 20 through eyeglass lens 26, such as ambient room lighting.

Microprocessor 28 may be coupled to a display 30 for displaying the spectral data. In one embodiment, microprocessor 28 is configured to output the spectral data to display 30 as a spectral curve 44 of light intensity as a function of wavelength. Portions of spectral curve 44 and/or the area below the spectral curve may be displayed in one or more colors according to the colors associated with those wavelengths. For example, the portion of spectral curve 44 and/or the area below the spectral curve corresponding to the range of wavelengths commonly associated with the color green (e.g, 495 nm to 570 nm) may be displayed in shades of green ranging from blue green (495 nm) to yellow green (570 nm). Processing and display of the spectral data preferably takes place in real time, to provide contemporaneous results when eyeglasses 40 are mounted on support 22.

In one embodiment, support 22 and light source 20 are spaced apart by a predetermined distance, to ensure reproducibility of measurements and accurate comparison of different lenses. As shown in FIG. 2, light source 20 and/or support 22 may be moveably mounted on a rail 32, that provides a reference for determining the distance 34 between the light source and support. Light source 20 and/or support 22 are moveable along rail 32 to increase or decrease the distance 34. In a further embodiment, support 22 has a predetermined orientation relative to light source 20. Support 22 may be rotatable on rail 32 about the support's vertical and/or horizontal axes. Rail 32 provides a reference for determining the orientation of support 22 relative to light source 20.

System 10 may also include a lens mount (not shown) positioned between the light source 20 and light detector 24, that is configured to receive a lens that is not mounted in an eyeglass frame (e.g., a lens blank or semifinished lens blank). The lens mount may be a separate structure positioned on the rail 32, or may be coupled to or incorporated in support 22.

In yet another embodiment, system 10 may be configured to allow side-by-side, simultaneous comparison of two different eyeglasses 40a, 40b. As best shown in FIGS. 2 and 3, system 10 may comprise two supports 22a, 22b configured as described above, for respectively mounting two different eyeglasses 40a, 40b. To ensure accurate comparison, supports 22a, 22b are preferably equidistant from and have similar or mirror orientations relative to a single light source 20 or separate identical light sources. For example, FIG. 2 shows supports 22a, 22b mounted on a single rail 32, positioned equidistant from and in mirror orientations to a single light source 20.

Each support 22a, 22b includes a light detector 24a, 24b positioned to receive light from light source 20 transmitted through the eyeglass lenses 26a, 26b of eyeglasses 40a, 40b, as described above. Light detectors 24a, 24b may be connected to the same microprocessor 28, or different microprocessors. The spectral data received by the microprocessor(s) 28 corresponding to the spectral data from light detectors 24a, 24b may be displayed on a single display 30, or are displayed separately via two displays 30a, 30b that are coupled to microprocessor(s) 28. In a preferred embodiment, spectral curves 44a, 44b corresponding to the spectral data from light detectors 24a, 24b are simultaneously displayed in real time on displays 30a, 30b for comparison of the performance of eyeglasses 40a, 40b.

While particular embodiments of the present disclosure have been illustrated and described, it would be obvious to those skilled in the art that various other changes and modifications can be made without departing from the spirit and scope of the present disclosure. It is therefore intended to cover in the appended claims all such changes and modifications that are within the scope of this disclosure.

What is claimed is:

1. A system for measuring transmission of light through a pair of eyeglasses including at least one eyeglass lens mounted in an eyeglass frame, the system comprising:
    a light source that simulates the solar spectrum over at least a portion of the range of wavelengths from about 280 nm to about 700 nm;
    a support for mounting the eyeglasses; and
    a light detector coupled to the support and positioned to receive light from the light source transmitted through the eyeglass lens.

2. The system of claim 1, wherein the light source simulates the solar spectrum over at least a portion of the range of wavelengths from about 280 nm to about 500 nm.

3. The system of claim 1, wherein the light source is a xenon lamp.

4. The system of claim 1, wherein the eyeglass lens is mounted in the eyeglass frame with a position of wear, and the support is configured to mount the eyeglasses with the position of wear relative to the light detector.

5. The system of claim 4, wherein the position of wear is selected from the group consisting of: pantoscopic tilt, optical center, vertex distance, panoramic angle and combinations thereof.

6. The system of claim 4, wherein the position of wear comprises a pantoscopic tilt between about 3° to about 10°.

7. The system of claim 1, further comprising:
    a processor coupled to the light detector; and
    a display coupled to the processor;
    wherein the processor receives spectral data from the light detector and outputs the spectral data to the display.

8. The system of claim 1, wherein the light detector comprises a spectrometer.

9. The system of claim 1, wherein the light detector comprises:
a spectrometer;
a light detector lens mounted on the support; and
a fiber optic cable coupling the light detector lens to the spectrometer.

10. The system of claim 9, wherein the light detector lens is an ashperic lens.

11. The system of claim 9, wherein the eyeglass lens is mounted in the eyeglass frame with a position of wear, and the support is configured to mount the eyeglasses with the position of wear relative to the light detector lens.

12. A system for measuring transmission of light through a pair of eyeglasses including at least one eyeglass lens mounted in an eyeglass frame with a position of wear, the system comprising:
a light source that simulates the solar spectrum over at least a portion of the range of wavelengths from about 280 nm to about 700 nm;
a support sized and shaped as a human head for mounting the eyeglasses, the support having features corresponding to a nose, an ear and an eye, wherein the nose and ear are configured to mount the eyeglasses with the position of wear relative to the eye; and
a light detector coupled to the support at the eye.

13. The system of claim 12, wherein the position of wear is selected from the group consisting of: pantoscopic tilt, optical center, vertex distance, panoramic angle and combinations thereof.

14. The system of claim 12, wherein the position of wear comprises a pantoscopic tilt between about 3° to about 10°.

15. The system of claim 12, further comprising:
a microprocessor coupled to the light detector; and
a display coupled to the microprocessor;
wherein the microprocessor receives spectral data from the light detector and outputs the spectral data to the display.

16. The system of claim 12, wherein the eye has an aperture, and the light detector is mounted in the aperture.

17. The system of claim 16, wherein the light detector comprises:
a spectrometer;
a light detector lens mounted in the aperture; and
a fiber optic cable coupling the light detector lens to the spectrometer;
wherein the nose and ear of the support are configured to mount the eyeglasses with the position of wear relative to the light detector lens.

18. The system of claim 17, wherein the light detector lens is an aspheric lens.

19. The system of claim 12, wherein the light source comprises a xenon lamp.

20. A system for comparing the transmission of light through first and second eyeglasses, respectively having first and second eyeglass lenses, the system comprising:
a light source;
first and second supports for respectively mounting the first and second eyeglasses, the first and second supports having about the same distance from and mirror orientation to the light source; and
first and second light detectors respectively coupled to the first and second supports and positioned to receive light from the light source transmitted through the first and second eyeglass lenses.

21. The system of claim 20, wherein the first and second eyeglasses respectively have first and second eyeglass lenses mounted in first and second eyeglass frames with first and second positions of wear, and wherein the first support is configured to mount the first eyeglasses with the first position of wear relative to the first light detector, and the second support is configured to mount the second eyeglasses with the second position of wear relative to the second light detector.

22. The system of claim 21, further comprising:
a microprocessor coupled to the first light detector; and
a first and second displays coupled to the microprocessor;
wherein the microprocessor receives first spectral data from the first light detector and outputs the first spectral data to the first display, and receives second spectral data from the second light detector and outputs the second spectral data to the second display.

23. The system of claim 1, wherein light source simulates the solar spectrum over the range of wavelengths from about 280 nm to about 700 nm.

24. The system of claim 4, wherein the position of wear comprises a pupillary height in a range between about 3 mm and about 7 mm above a geometric center of the eyeglass lens.

25. The system of claim 4, wherein the position of wear comprises an interpupillary distance in a range between about 48 mm and about 73 mm relative to an optical axis of the light detector.

26. The system of claim 4, wherein the position of wear comprises a vertex distance in a range between about 5 mm and about 20 mm relative to a position of the light detector.

27. The system of claim 4, wherein the position of wear comprises a panoramic angle in a range between about 0° and about 25° relative to an optical axis of the light detector.

28. The system of claim 7, wherein the processor subtracts background light data from sample light to data to output the spectral data to the display.

29. The system of claim 7, wherein the processor subtracts background light data from reference light data to output the spectral data to the display.

30. The system of claim 20, further comprising at least one display configured to display spectral data in real time from at least one of the first and second light detectors.

31. The system of claim 20, further comprising at least one display configured to display at least one spectral curve and a display color corresponding to a color associated with a wavelength of the at least one spectral curve.

32. The system of claim 20, wherein the light source is moveably mounted on a rail to maintain the first and second supports the same distance from and mirror orientation to the light source.

33. The system of claim 20, wherein the first and second supports are moveable mounted on a rail to maintain the same distance from and mirror orientation to the light source.

* * * * *

UNITED STATES PATENT AND TRADEMARK OFFICE
CERTIFICATE OF CORRECTION

| | |
|---|---|
| PATENT NO. | : 10,018,530 B2 |
| APPLICATION NO. | : 15/089022 |
| DATED | : July 10, 2018 |
| INVENTOR(S) | : Prashant Santan, Newton M. Tarleton and Gavin Ho |

It is certified that error appears in the above-identified patent and that said Letters Patent is hereby corrected as shown below:

In the Drawings

Replace Sheet 1 of 6 with Drawing Sheet 1 of 6 as shown on the attached sheet.

Replace Sheet 2 of 6 with Drawing Sheet 2 of 6 as shown on the attached sheet.

Replace Sheet 3 of 6 with Drawing Sheet 3 of 6 as shown on the attached sheet.

Replace Sheet 4 of 6 with Drawing Sheet 4 of 6 as shown on the attached sheet.

Replace Sheet 5 of 6 with Drawing Sheet 5 of 6 as shown on the attached sheet.

Replace Sheet 6 of 6 with Drawing Sheet 6 of 6 as shown on the attached sheet.

Signed and Sealed this
Eleventh Day of September, 2018

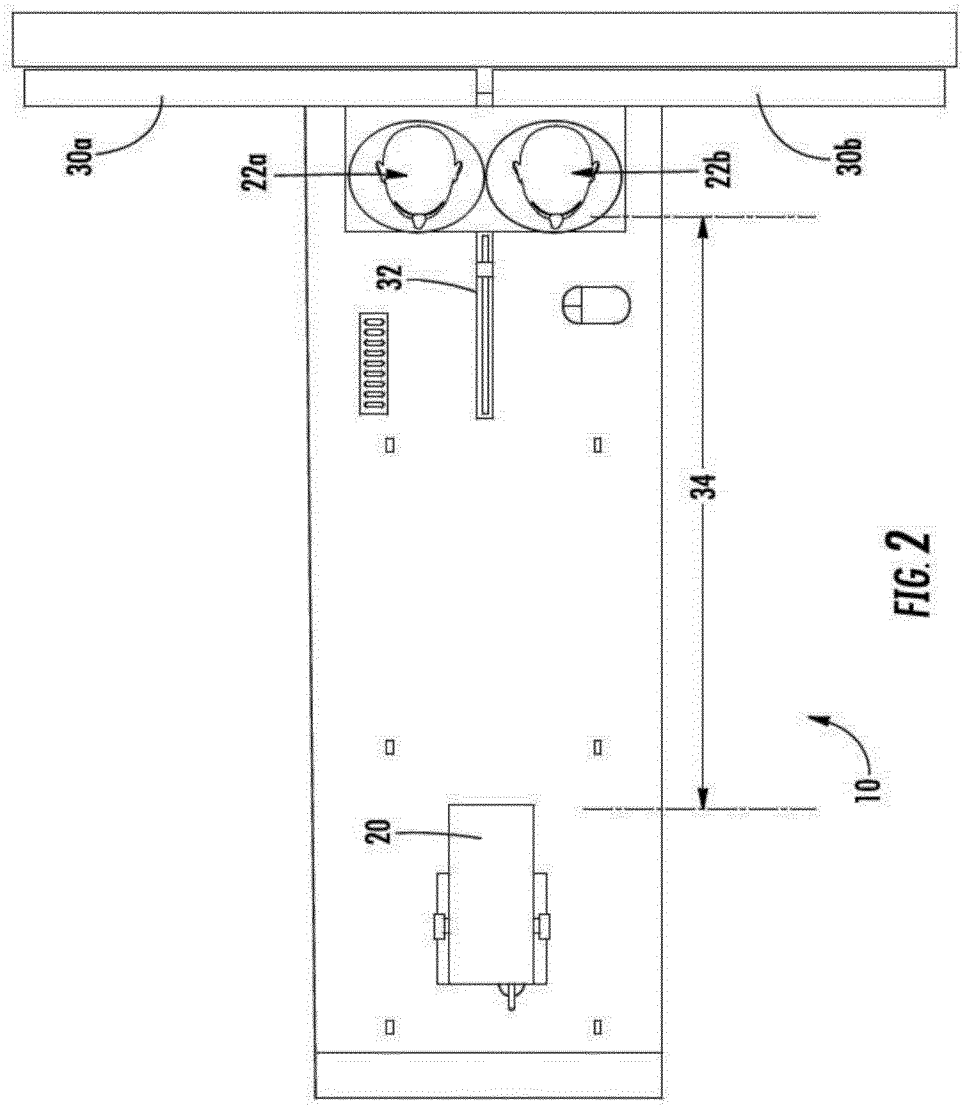

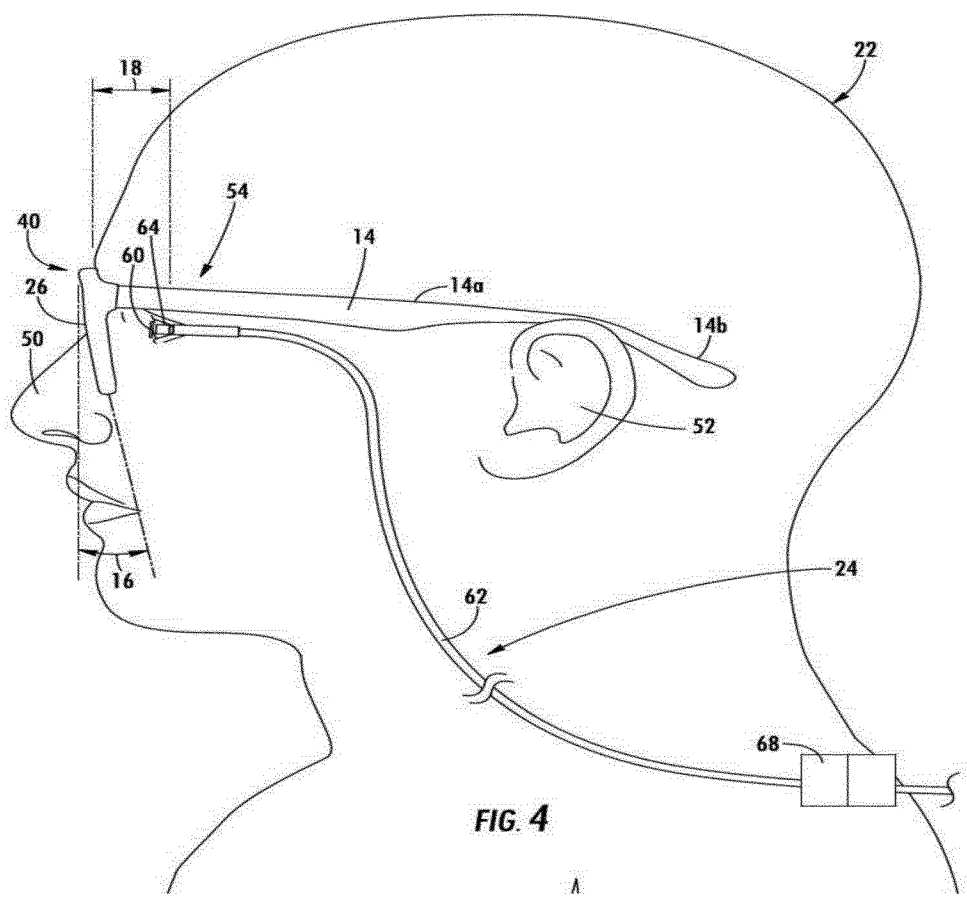

Andrei Iancu
*Director of the United States Patent and Trademark Office*